United States Patent
Rapp et al.

(10) Patent No.: US 12,398,747 B2
(45) Date of Patent: Aug. 26, 2025

(54) FITTING FOR FIXING A THREADED ELEMENT TO A WALL SECTION

(71) Applicant: SACS Aerospace GmbH, Empfingen (DE)

(72) Inventors: Andreas Rapp, Dornhan (DE); Eugen Blank, Bösingen (DE); Roland Moser, Obernheim (DE)

(73) Assignee: SACS Aerospace GmbH, Empfingen (DE)

( * ) Notice: Subject to any disclaimer, the term of this patent is extended or adjusted under 35 U.S.C. 154(b) by 176 days.

(21) Appl. No.: 17/391,214

(22) Filed: Aug. 2, 2021

(65) Prior Publication Data
US 2022/0034434 A1 Feb. 3, 2022

(30) Foreign Application Priority Data

Aug. 3, 2020 (DE) .......................... 102020209729.1
May 26, 2021 (DE) .......................... 102021205352.1

(51) Int. Cl.
*F16B 37/04* (2006.01)
(52) U.S. Cl.
CPC .................................. *F16B 37/044* (2013.01)
(58) Field of Classification Search
CPC ............ F16B 37/044; F16B 2001/0092; F16B 33/002; F16B 37/042; F16B 13/0825
USPC ............................ 411/81, 176, 182, 111, 112
See application file for complete search history.

(56) References Cited

U.S. PATENT DOCUMENTS

| 2,820,499 | A | | 1/1958 | Schaaf | |
|---|---|---|---|---|---|
| 3,339,609 | A | * | 9/1967 | Cushman | B64C 1/12 264/261 |
| 4,557,650 | A | * | 12/1985 | Molina | F16B 37/068 411/108 |
| 5,378,099 | A | * | 1/1995 | Gauron | F16B 5/01 411/258 |
| 6,183,180 | B1 | | 2/2001 | Copple et al. | |
| 9,587,670 | B2 | * | 3/2017 | Matignon | B64F 5/10 |
| 2013/0094921 | A1 | * | 4/2013 | McClure | F16B 5/0225 411/45 |

(Continued)

FOREIGN PATENT DOCUMENTS

| DE | 4231313 A1 * | 3/1994 | ......... F16B 13/0825 |
|---|---|---|---|
| DE | 4412431 C1 | 10/1995 | |

(Continued)

*Primary Examiner* — Kristina R Fulton
*Assistant Examiner* — Jock Wong
(74) *Attorney, Agent, or Firm* — Hoffmann & Baron, LLP

(57) ABSTRACT

Fitting for fixing a threaded element to a wall section, including a base body which is penetrated by a recess, which recess is extended along a central axis, further including a clamping ring which is rotatably mounted on an outer surface of the base body, wherein a cam is assigned to the outer surface of the base body or to the clamping ring, which cam effectuates a change in diameter of the clamping ring during a rotary movement of the clamping ring relative to the base body, wherein a coupling part is movably received in the recess and forms with the base body a rotary coupling, wherein a threaded portion of the coupling part determines a thread axis, wherein the coupling part is accommodated in the recess with a variable orientation of the thread axis within a predetermined angular interval and/or within a predetermined distance interval to the central axis.

11 Claims, 7 Drawing Sheets

(56) References Cited

U.S. PATENT DOCUMENTS

| | | | | |
|---|---|---|---|---|
| 2015/0308479 A1* | 10/2015 | Brown | ............... | F16B 19/05 |
| | | | | 411/361 |
| 2016/0186796 A1* | 6/2016 | Verdier | ............ | F16B 37/044 |
| | | | | 29/458 |
| 2016/0245318 A1* | 8/2016 | Rajeev | .................. | F16B 5/01 |
| 2020/0208661 A1 | 7/2020 | Wilke et al. | | |

FOREIGN PATENT DOCUMENTS

| | | | | |
|---|---|---|---|---|
| DE | 102004045675 B4 | | 5/2006 | |
| DE | 102012019037 | | 3/2014 | |
| DE | 102012019037 A1 | | 3/2014 | |
| DE | 102014224932 A1 | * | 6/2016 | |
| EP | 0696686 | | 7/1999 | |
| EP | 0696686 B1 | | 7/1999 | |
| EP | 1744063 A2 | | 1/2007 | |
| EP | 2655902 | | 8/2017 | |
| EP | 2655902 B1 | | 8/2017 | |
| GB | 1010013 | * | 11/2017 | |
| KR | 100843934 | | 7/2008 | |
| KR | 100843934 B1 | | 7/2008 | |
| WO | WO-03085274 A1 | * | 10/2003 | ............ F16B 13/066 |
| WO | 2020/055624 A1 | | 3/2020 | |
| WO | WO 2020/055624 | | 3/2020 | |

* cited by examiner

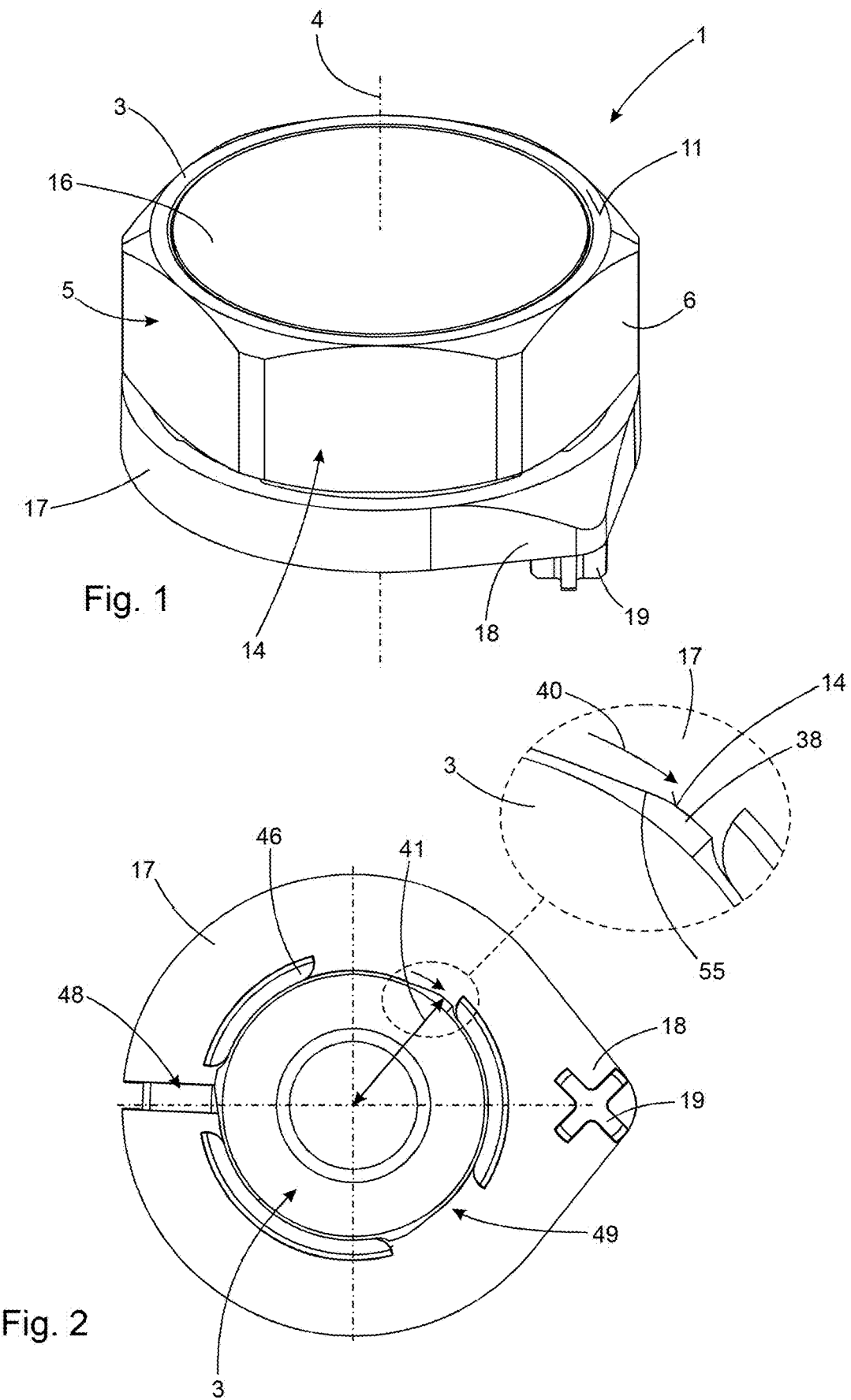

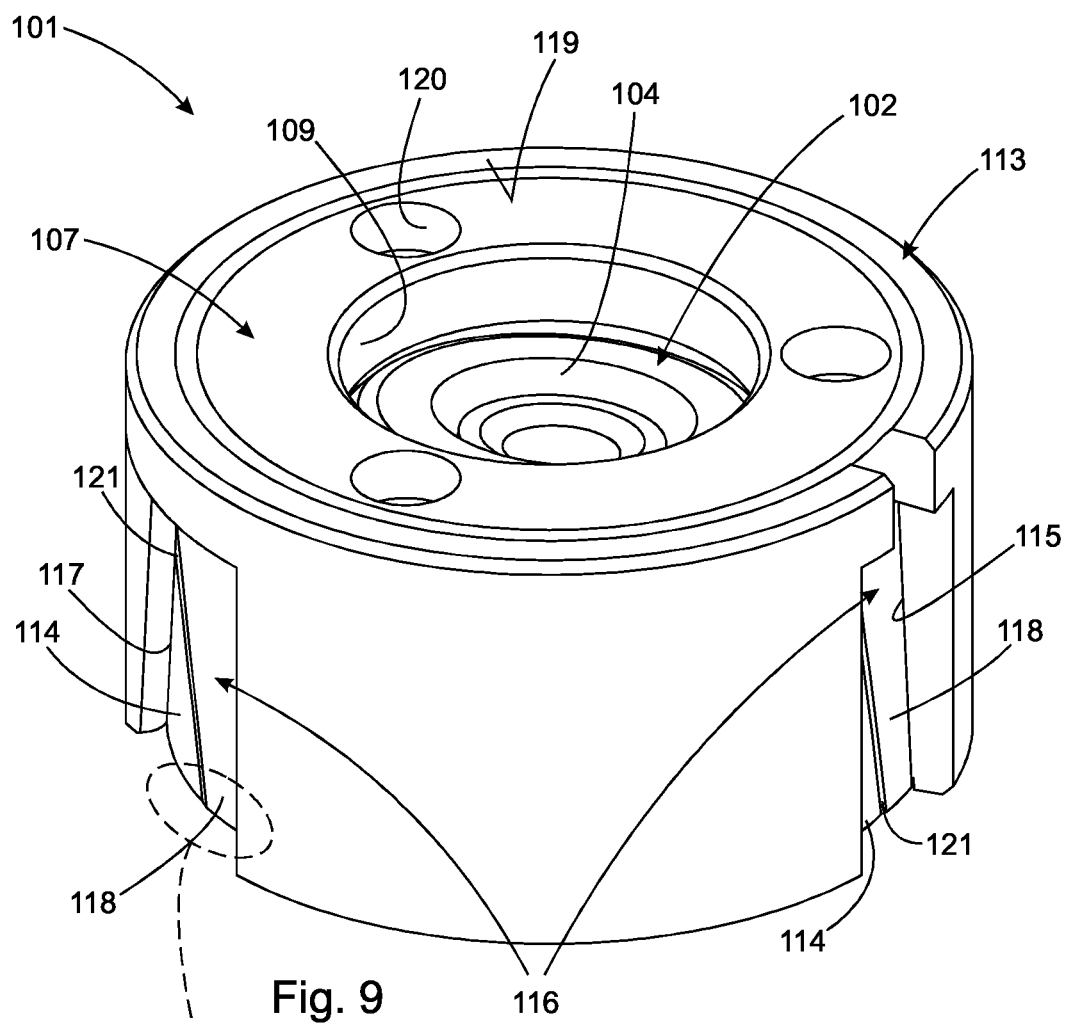
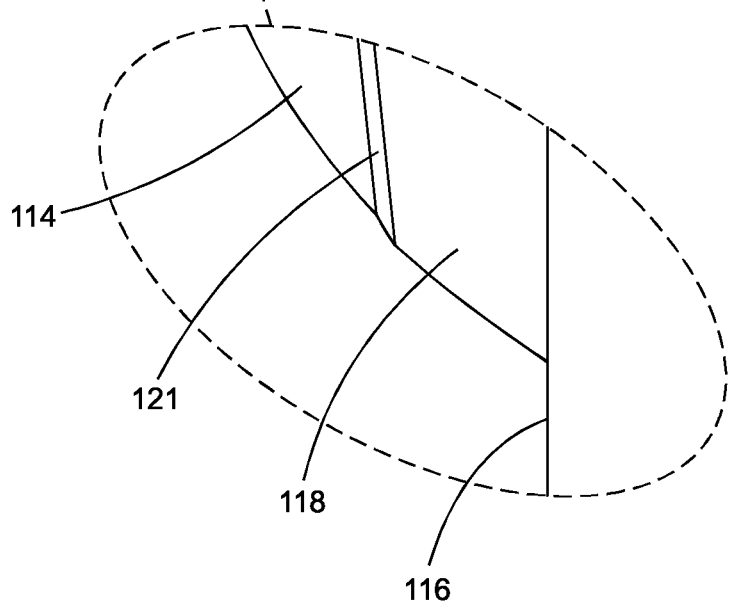
Fig. 9

FITTING FOR FIXING A THREADED ELEMENT TO A WALL SECTION

BACKGROUND OF THE INVENTION

The invention relates to a fitting for fixing a threaded element to a wall section, having a base body through which a recess passes which extends along a central axis, having a clamping ring which is rotatably mounted on an outer surface, in particular on a sleeve section arranged coaxially with the central axis, of the base body, a first cam being assigned to the outer surface, in particular to the sleeve section, and/or a second cam being assigned to the clamping ring, wherein the first cam and/or the second cam is/are designed for an elastic or elastic and plastic change in diameter of the clamping ring during a rotary movement of the clamping ring relative to the base body.

From DE 10 2004 045 675 B1 a clamping means is known which comprises a mounting part and a clamping part which can be connected to one another, wherein cams are arranged on the mounting part or the clamping part by means of which the mounting part and the clamping part are clamped to one another.

SUMMARY OF THE INVENTION

The task of the invention is to provide a fitting which can be used in a variety of ways.

This task is solved for a fitting of the type mentioned above with the following features: The fitting comprises a coupling part which is movably received in the recess and forms with the base body a rotary coupling for a transmission of a torque between the coupling part and the base body about the central axis, wherein a threaded portion of the coupling part determines a thread axis which is aligned with a variable orientation in a predetermined angular interval and/or in a predetermined distance interval to the central axis. The rotary coupling formed by the coupling part and the base body has some clearance or play in a release position and allows a transmission of torque between the coupling part and the base body in a functional position.

The fitting is used to reliably secure another component, such as a cladding, to the wall section in a simple manner. It is assumed that the wall section is provided with a recess which allows at least a partial accommodation of the clamping ring of the fitting, wherein a fixing of the fitting to the wall section is effected by initiating a relative movement between the base body and the clamping ring, whereby an elastic deformation or in certain cases an elastic and plastic deformation of the clamping ring occurs during the expansion of the clamping ring due to the interaction of the at least one first cam of the sleeve section of the base body with the clamping ring and/or of the second cam of the clamping ring with the sleeve section of the base body.

This enables a non-positive/frictional coupling of the fitting with the wall section.

For the connection of the component to be fixed, which may be a cladding, with the fitting, a threaded portion is formed on a coupling part, which is associated with the fitting. The threaded portion may be realized as a stud bolt or as a threaded bore. In this case, the base body with the recess provided therein and the coupling part are matched to one another in such a way that, during a screwing operation with which, for example, a nut or a screw is to be fixed to the threaded portion of the coupling part in order to fasten the further component, a torque is introduced about the central axis of the base body from the coupling part to the base body and due to this torque, the desired rotational relative movement between the base body and the clamping ring is effectuated, which results in the elastic or elastic and plastic expansion of the clamping ring. The threaded portion may comprise one or more thread turns and may, for example, be formed as a metric thread or as an inch thread. As an alternative the thread of the threaded portion is extended over an angular range which is less than 360 degrees to realize a locking between the coupling member and a corresponding locking element in the manner of a bayonet connection.

In principle, it is indeed desirable that the recess in the wall section which is to serve for receiving at least a portion of the clamping ring of the fitting is made in the wall section in such a way that an unproblematic fixing of the component to be fixed is ensured. Due to manufacturing tolerances for the wall section and for the recesses formed therein as well as for the component to be fixed, the situation may arise that a fixing region of the component to be fixed, which may be formed, for example, as a hole for receiving a screw to be used for engagement in the threaded portion of the coupling part, is not aligned in an optimum manner. Accordingly, either reworking of the component to be fixed must be accepted in order to compensate for existing tolerances, or the component to be fixed is fixed to the wall section under a certain, usually undesirable, pretension by means of the fitting. In order to reduce the influence of such manufacturing tolerances, which can hardly be avoided, it is provided that the coupling part is movably received in the recess of the base body, so that a tolerance compensation for position tolerances is ensured at least within certain limits. In order to enable the desired non-positive/frictional fixing of the fitting to the wall section despite the movability of the coupling part in the recess of the base body, the recess of the base body and the coupling part form a rotary coupling with limited play or backlash. On the one hand this allows a certain adjustment of the spatial orientation of the coupling part relative to the base body and thus a compensation of tolerances. On the other hand this allows a torque transmission between a fastening means for the component to be fixed, such as a bolt or a nut, and the threaded portion of the coupling part and the base body, thereby ensuring the relative movement of the base body with respect to the clamping ring and the resulting elastic or elastic and plastic expansion of the clamping ring.

Here, it is provided that the coupling part and the recess of the base body are adapted to each other in such a way that a thread axis of the coupling part, which is determined by the threaded portion, is positionally variable within a movement space determined by the geometry of the recess and the geometry of the coupling part. By way of example, it is provided that the coupling part can be rotated relative to the base body about the central axis in a predetermined angular range, for example in a range of +/−20 degrees. The coupling part assumes a blocking position relative to the base body when an interval limit of this angular range is reached, in which blocking position the desired torque transmission about the central axis between the coupling part and the base body can be carried out. Similarly, it can be provided that the coupling part is accommodated in the recess so as to be linearly movable within a certain, predetermined interval. In this case, a linear movement of the coupling part relative to the base body can be provided both in spatial directions parallel to the central axis and in spatial directions transverse to the central axis. In addition or alternatively, it can be provided that the coupling part is accommodated in the recess so that it can tilt within a certain, predefined angular interval. Preferably, tilting movements of the coupling part relative to the base body take place about tilting axes which are aligned transversely to the center axis. As for the rotary movement of the coupling part about the center axis, maximum (restricted) deflections are also provided for linear movements and/or tilting movements of the coupling part relative to the base body, respectively. For linear movements, it is assumed that the thread axis of the coupling part cannot exceed a predetermined maximum distance relative to the center axis. For tilting movements of the coupling part, it is assumed that the thread axis of the coupling part cannot exceed a predetermined maximum angle relative to the center axis.

Additionally or alternatively, the solution of the problem underlying the invention can be described in that a coupling part is accommodated in the recess, which coupling part is provided with a threaded portion for accommodating a threaded element, the threaded portion defining a thread axis, and the recess and the coupling part being adapted to one another in such a manner that the coupling part is accommodated in the recess so as to be tiltable and/or linearly movable in a release position with at least one geometrically limited degree of freedom of movement and is designed in a functional position for torque transmission between the threaded portion, which is in particular designed as an internal thread, and the base body. In particular the coupling part is movably accommodated in the recess and has, in a release position, at least one geometrically limited degree of freedom of movement with respect to the base body. Furthermore the coupling part is provided with a threaded portion for accommodating a threaded element, the threaded portion defining a thread axis. The coupling part enables a torque transmission between the threaded portion and the base body in a functional position.

Here it is assumed that in the release position no torque transmission takes place between the coupling part and the base body. A relative movement of the coupling part with respect to the base body can take place with a limited range of movement due to the geometric design of the coupling part and the recess in the base body, which can be described as a geometrically limited degree of freedom of movement (rotational and/or linear). Depending on the geometry of the coupling part and the geometry of the recess in the base body, a relative movement between the coupling part and the base body can be performed exclusively linearly or exclusively rotationally or as a combination of a linear and a rotational movement. During a screw-in operation for a screw to be screwed into a threaded hole (threaded portion) of the coupling part or during a screw-on operation for a nut onto a stud bolt (threaded portion) of the coupling part a torque is applied to the threaded portion of the coupling part. This torque effectuates a rotational movement between the coupling part and the base body between the release position and the functional position. Typically the rotational movement is a movement of the coupling part relative to the base body about the central axis. In the functional position a positive coupling between the coupling part and the base body is achieved due to the geometry of the coupling part and the geometry of the recess in the base body. This positive coupling allows a transmission of torque from the coupling part to the base body, which then results in the desired relative movement between the base body and the clamping ring. Depending on the design of the geometries of the coupling part and the recess, a centering of the coupling part relative to the base body may take place during the transition from the release position to the rotational position, but this is neither necessary nor mandatory for the function of the fitting.

Alternatively the relative movement between the base body and the clamping ring is effected by a direct torque application to the base body, for example by means of a wrench which acts on suitable wrench flats of the base body. In this case the fitting is already fixed to the wall section and a screwing-in/screwing-on operation for the component to be fastened with a screw or nut is carried out later.

According to a further definition of the invention a region of an outer surface of the coupling part determines a first profile and a region of an inner surface of the recess determines a second profile, wherein the first profile and the second profile define in a functional position a rotary coupling for a torque transmission between the coupling part and the base body. In a release position there is a predefined play/clearance between the coupling part and the base body which allows a relative movement between the coupling part and the base body with at least one geometrically limited rotational degree of freedom and/or with at least one geometrically limited linear degree of freedom of the movement.

It is expedient if the coupling part has a first cross-section in a cross-sectional plane aligned transversely to the central axis, and if the recess has a second cross-section in the cross-sectional plane, wherein the first cross-section and the second cross-section are of geometrically similar design. For example the second cross-section is derived from the first cross-section by stretching. Preferably, a first profile of the coupling part and a second profile of the recess are formed in such a way that they have geometrically similar cross sections in a common cross-sectional plane when the thread axis and the central axis are aligned parallel, in particular coaxial. A geometric similarity exists, for example, if the first cross-section can be transformed into the second cross-section by means of an elongation, in particular by means of a centered elongation. Furthermore, for the transmission of a torque between the coupling part and the base body, it is to be provided that a maximum extension of the first cross-section of the coupling part exceeds at least partially a minimum extension of the second cross-section of the recess. This enables a torque transmission between the coupling part and the base body by positive fit.

Preferably, it is provided that the clamping ring comprises a cantilever which projects transversely to the central axis in the radial direction, which cantilever is provided at the end with a support mandrel extending along the central axis. The task of the cantilever and the support mandrel fixed thereto is to provide torque support for the clamping ring relative to the wall section to which the fitting is to be fixed. Without the extension arm and the support mandrel attached thereto, a frictional connection between an outer circumferential surface of the clamping ring and an inner circumferential surface of the recess, which is provided in the wall section, is necessary to ensure the torque support between the clamping ring and the wall section when a torque is introduced onto the coupling part.

The cantilever and the support mandrel formed thereon, which engages in a second recess in the wall section arranged adjacent to the recess formed for receiving the clamping ring in the wall section, provide direct form-fit torque support for the clamping ring. Accordingly, the tolerance requirements for the recess in the wall section formed to receive the clamping ring are lower. According to an alternative embodiment of the invention, it is provided that the outer circumferential surface of the clamping ring is non-circular and the recess in the wall section has a geometry corresponding to the outer circumferential surface of the clamping ring, whereby a form-fitting reception of the clamping ring in the wall section can also be ensured with respect to a torque introduction about the central axis of the fitting.

According to a further development of the invention, it is provided that the first cam is formed with a wedge-shaped profiling on an arcuate, in particular circular-cylindrical, outer surface of the sleeve section of the base body, which cam projects outwards in the radial direction. The clamping ring is provided with at least one recess which, in a release position of the clamping ring relative to the base body, is formed to receive the first cam. The wedge-shaped profiling of the cam is visible in the cross-sectional plane aligned transversely to the central axis. The cam extends over a section of the circumference of the outer surface of the sleeve section along a circumferential direction of the outer surface. Furthermore an increase in a distance between the central axis of the sleeve section and the respective section of the outer surface of the sleeve section is provided for the cam. This design of the cam ensures an almost linear increase in the elastic or elastic and plastic deformation of the clamping ring due to the interaction of the first cam with the inner surface of the clamping ring during a relative movement between the base body and the clamping ring. This at least almost linear increase in the elastic or elastic and plastic deformation of the clamping ring provides a substantially proportional relationship between a pivot angle between the base body and the clamping ring and the elastic or elastic and plastic deformation of the clamping ring. It is further provided that, in the release position of the clamping ring relative to the base body, the first cam arranged on the sleeve portion of the base body projects into a recess of the clamping ring. This recess in the clamping ring ensures that in the release position the clamping ring has no substantial elastic deformation and thus no plastic deformation due to the interaction with the first cam.

According to a further embodiment of the invention, it is provided that the coupling part has a guide section, which may be designed as a plane-parallel plate, which guide section is accommodated between a first axial surface of the base body and a second axial surface of the base body, which second axial surface is designed opposite, in particular parallel, to the first axial surface. This design of the first and second axial surface ensures a limitation of relative movements of the coupling part with respect to the base body to (only/exclusively) linear movements in a movement plane aligned transversely with respect to the central axis. Due to the interaction of the guide section formed on the coupling part and the oppositely formed first and second axial surfaces of the base body, a form fit is achieved between the coupling part and the base body with respect to tilting movements whose axes of movement are aligned transversely to the central axis of the base body. Accordingly, the coupling part can only perform relative movements in a plane of movement that is aligned transverse to the center axis. In addition, it can be provided that the guide section of the coupling part and a region of the recess formed between the two axial surfaces of the base body are profiled in a cross-sectional plane aligned transversely to the center axis in such a way that an additional restriction of the relative mobility between the coupling part and the base body to exactly one spatial direction or a predetermined corridor of movement within the cross-sectional plane is achieved.

It is expedient if the coupling part comprises a first coupling body which is accommodated in the recess so as to be tiltable about at least one tilting axes. Preferably the first coupling body is accommodated in the first coupling body so as to be tiltable about two tilting axes which are aligned perpendicularly to one another and transversely to the central axis of the base body. Furthermore the coupling part comprises a second coupling body which is provided with the threaded portion and which is accommodated in or on the first coupling body so as to be linearly movable with respect to the first coupling body. Thus, the first coupling body fulfills the task of enabling an angular alignment of the thread axis relative to the center axis at least within a predetermined angular range. Exemplarily, the angular range within which the first coupling body can be aligned relative to the base body can be described as a cone or cone section, wherein the center axis of the base body also forms the center axis of the cone or cone section and the cone envelope or cone section envelope is determined by the possible alignment of the thread axis. The task of the second coupling part is to enable a limited linear movement with respect to the first coupling part in order to enable a linear adjustment of the position of the thread axis in addition to an angular alignment for the thread axis. For this purpose the second coupling body may comprise a guide section which is accommodated in a correspondingly formed recess in the first coupling body, whereby the desired limitation of the linear mobility between the first and second coupling bodies is achieved. Furthermore, the guide section of the second coupling body and the recess in the first coupling body, as well as the first coupling body in relation to the recess in the base body, are designed for a transmission of a torque which is to be transmitted by interaction of a threaded element, in particular a screw or a nut, with the threaded portion in the second coupling part via the first coupling part and the base body up to the clamping ring and the wall section.

It is advantageous if a region of the recess has a smaller cross-section than the coupling part to provide an undercut for the coupling part to enable a transmission of force between the coupling part and the base body along the central axis by form fit. This ensures axial force transmission between the coupling part and the base body along the central axis.

In an alternative embodiment for the fitting, it is provided that the clamping ring surrounds the outer surface of the base body at least almost completely, in particular completely. This embodiment of the fitting can be mounted in workpieces that are only provided with blind holes and therefore only allow access to the fitting on one side. The application of the torque for elastic deformation of the clamping ring, which largely or completely covers the outer surface of the base body, is effected by a torque which is introduced into the coupling element either via a suitable fastening element, such as a screw, or via a tool which can be attached to the base body in a torque-transmitting manner. This torque can be supported by the clamping ring already coming into frictional contact with the workpiece during assembly in the recess or blind hole in such a way that sufficient torque transmission between the fitting and the workpiece is ensured.

Supplementary or alternatively, it may be provided that a suitable tool is attached to the clamping ring in order to be able to realize the desired torque support without involving the workpiece. Accordingly, it may be provided that a tool coupling for receiving a tool is formed on an axially aligned end face of the base body and/or on an axially aligned end face of the clamping ring.

As an option the fitting is inserted, possibly with the aid of a hammer or purely manually or mechanically, into the recess or blind hole or also into a through hole of the workpiece. Afterwards the torque is introduced solely by screwing the component to be fastened via the screw used for this purpose with the aid of further tools. This effectuates to the desired relative movement between the base body and the clamping ring in order to ensure the force-locking fixing of the fitting in the workpiece. Depending on the material selected for the workpiece into which the fitting is to be inserted, an outer surface of the clamping ring can be provided with a profiling, in particular with longitudinal grooves or knurling, and/or with a friction-enhancing coating, for example a rubber coating.

In a further embodiment of the invention, it is provided that the outer surface of the base body and an inner surface of the clamping ring are each formed in the shape of conical sections. Preferably, the two cone-section-shaped geometries of the base body and the clamping ring are tapered in the direction of a mouth opening of the recess in the base body. This causes an additional wedge effect between the base body and the clamping ring when tensile forces are applied to the fitting, which leads to an improvement in the frictional fixing of the fitting in the workpiece. Preferably, the outer surface of the base body and the inner surface of the clamping ring are designed with a taper angle in the range of 0 degrees to 5 degrees relative to the center axis of the recess.

According to a further embodiment of the invention, it is provided that a control edge determined by the cam is oriented at an acute angle to an edge of a recess in the clamping ring. Advantageously, the cam or a plurality of cams are arranged on the outer surface of the base body and are each configured for interaction with an edge of a recess in the clamping ring. Preferably, it is provided that the clamping ring is formed as a slotted ring to facilitate the desired elastic deformation by interaction of the cam or the cams with the corresponding edge or edges formed, in particular, at recesses in the clamping ring. Preferably, it is provided that the clamping ring is provided with a number of recesses whose amount is equal to the number of cams. The acute-angled arrangement of the cams with respect to the edges has the effect that, when the cam first strikes the edge, complete deformation of the clamping ring does not have to take place over a short distance, which would require the introduction of a high torque. Purely by way of example, it is provided that the edge provided for interaction with the cam is aligned parallel to the center axis of the recess. In this case, the cam is also oriented at an acute angle relative to the center axis of the recess. Additionally or alternatively, it can be provided that a plurality of cams and associated recesses are arranged in a phase-shifted manner, so that a cascaded engagement of the individual cams is ensured in the event of a rotational relative movement between the base body and the clamping ring. This arrangement of the cams avoids an excessively high torque during the relative movement between the base body and the clamping ring.

BRIEF DESCRIPTION OF THE DRAWINGS

Advantageous embodiments of the invention are shown in the drawing. Here shows:

FIG. 1 a perspective view of a first embodiment of a fitting,

FIG. 2 a view from below of the fitting according to FIG. 1,

DETAILED DESCRIPTION

Figure 3:
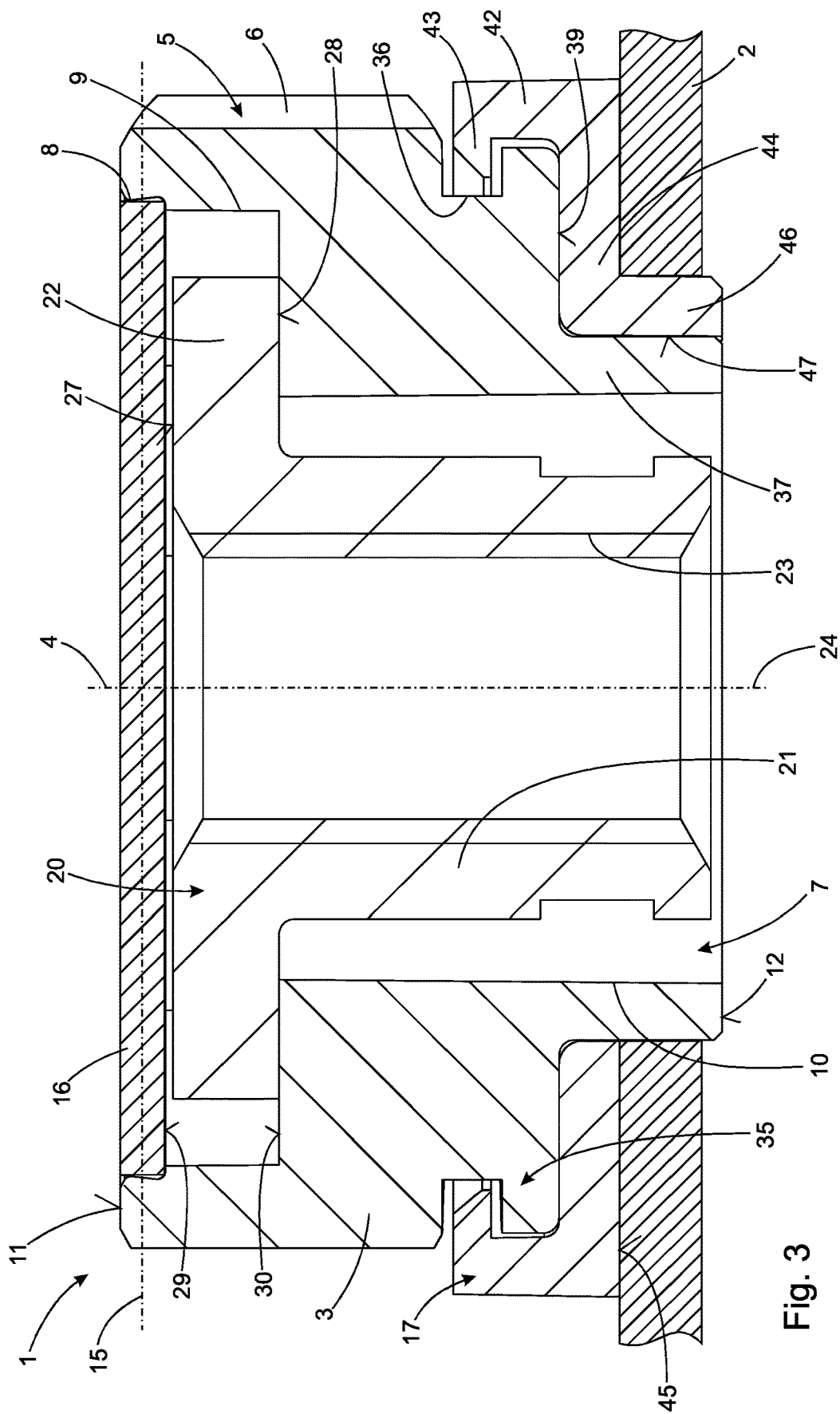
FIG. 3 a sectional view of the fitting according to FIGS. 1 and 2.

A first embodiment of a fitting 1 shown in FIGS. 1 to 4 is designed for connecting a screw, which is not shown, to a wall section 2 shown purely schematically in FIG. 3. For example, a fitting 1 of this type can be used in the field of aircraft construction in order to fasten components such as trim parts to an inner wall of an aircraft fuselage. Here, the fitting 1 should preferably be attached to the wall section 2 in a manner in which it is not necessary to intercept a torque by means of a tool such as an open-end wrench when a screwing-in operation is carried out for the screw (not shown). Such a torque introduction on both sides is necessary, for example, for a classic screw connection with a screw and a nut, since a torque must be applied both to the screw head of the screw and to the nut into which the screw is screwed. Alternatively, provision can also be made to screw the screw directly into a thread in the wall section, but for this purpose the wall thickness of the wall section is often too small to ensure reliable fixing of the screw.

In the case of the fitting 1 according to FIGS. 1 to 4 and also in the case of the further embodiments according to FIGS. 5 to 8, on the other hand, provision is made for creating a frictional connection between the wall section 2 and the fitting 1 or the alternative embodiments, without the need for counter-holding with a second tool or time-consuming preparation of the wall section, for example by thread cutting, for this purpose.

To ensure this function, the fitting 1 comprises a base body 3 which is extended along a central axis 4. Purely by way of example, the base body 3 is provided on an outer surface 14 with a hexagonal profiling 5 to provide key surfaces 6, which are arranged in pairs symmetrically with respect to the central axis 4. As can be seen from the illustration in FIG. 2, the base body 3 is penetrated by a recess 7 extending along the central axis 4. By way of example, the recess 7 comprises a total of three recess sections 8, 9 and 10. As can be seen from FIGS. 1, 3 and 4, the first recess section 8 is formed with a circular cross-section in a cross-sectional plane 15 which is only symbolically drawn in FIG. 3 and is aligned transversely to the central axis 4. As can be seen from the sectional view of FIG. 3, the upper recess section 8 can be realized, by way of example, as a cone section which tapers along the central axis 4 towards an upper side 11 of the base body 3. In the upper recess section 8, a circular cover plate 16, which is designed as a plane-parallel plate, is received in the base body 3 and delimits the recess 7 in the axial direction. Adjacent to the upper recess section 8 is a central recess section 9, the profiling of which can be seen in the illustration of FIG. 4. Purely by way of example, the middle recess section 9 has a profiling which essentially corresponds to the outer contour of the cipher 8. Adjacent to the central recess section 9, along the central axis 4, is a lower recess section 10 which opens out on an underside 12 of the base body 3.

A coupling part 20 is accommodated in the recess 7, which has a sleeve 21 and a guide section 22, which is formed at the end of the sleeve 21 and extends outwards in the radial direction. The coupling part 20 is penetrated by a threaded portion formed as an internally threaded bore 23, wherein an axis of symmetry of the internally threaded bore 23 is also referred to as a thread axis 24. Exemplarily, the sleeve 21 is formed rotationally symmetrically with respect to the thread axis 24. Furthermore, the guide section 22, which can also be referred to as the first profile, is realized in a cross-sectional plane (not shown) which is aligned parallel to the cross-sectional plane 15 with a profiling which is geometrically similar to the profiling of the central recess section 9, which can also be referred to as the second profile, and which corresponds substantially to the outer contour of the cipher 8.

Purely by way of example, the guide section 22 and the central recess section 9 can be transferred into one another by stretching in two spatial directions perpendicular to one another, which are not shown, and which are aligned transversely to the central axis 4. As can be seen from the illustration of FIG. 4, a minimum extension 25 of the central recess 9 is smaller than a maximum extension 26 of the guide section 22. As a result, when the coupling part 20 is rotated about the central axis 4 from the release position according to FIG. 4 into a functional position not shown, a torque transmission about the central axis 4 is made possible between the coupling part 20 and the base body 3 due to the form fit occurring with respect to the central axis 4. In this respect, the coupling part 20 has a degree of rotational freedom about the central axis 4 which is limited in terms of the angle of pivoting with respect to the base body 3.

It is further provided that an upper surface 27 of the guide portion 22 is arranged opposite a first axial surface 29 defined by a lower surface of the cover plate 16. The cover plate 16 is received in the upper recess section 8 of the base body 3 in a force-fit manner or alternatively in a force-fit manner and also in a form-fit manner, at least by elastic deformation, if necessary also by plastic deformation, and can thus be regarded as a component of the base body 3.

An underside 28 of the guide section 22 rests against an axial end face of the base body 3, which is also referred to as the second axial face 30 and which is created by the transition between the central recess section 9 and the lower recess section 10.

Purely by way of example, it is provided that both the first axial surface 29 and the second axial surface 30 are each formed flat. It is further provided that the first axial surface 29 and the second axial surface 30 are spaced apart in parallel. Furthermore, it is provided that the upper surface 27 and the lower surface 28 of the guide section 22 are formed in the manner of a plane-parallel plate. By these measures a restriction of a relative mobility of the coupling part 20 with respect to the base body 3 to linear movements in a plane of movement (not shown), which is oriented transversely to the center axis 4, is effectuated. The swivel mobility of the coupling part 20 relative to the base body 3 is not impaired by the above mentioned measures. Therefore relative movements between the coupling part 20 and the base body 3 can take place as linear movements in the plane of movement aligned transversely to the center axis 4 as well as rotational movements about the center axis 4. Due to the profiling of the central recess section 9 and the guide section 22 both a limitation of the linear movements and a limitation of the swivel movement are ensured.

As can be seen from the illustration of FIG. 3, adjoining the hexagonal profiling 5 of the base body 3 is a bearing section 35 which belongs to the outer surface 14 of the base body 3 and which is designed rotationally symmetrical with respect to the central axis 4. Furthermore the bearing section 35 is designed to receive a clamping ring 17 in a rotationally movable manner Exemplarily, the bearing section 35 is of circular-cylindrical design, whereby directly adjacent to the hexagonal profiling 5 of the base body a circumferential groove 36 is placed in the bearing section 35, which circumferential groove 36 has rectangular cross-section in the plane of representation according to FIG. 3. Adjacent to the bearing section 35 and along the central axis 4, a sleeve section 37 is formed which belongs to the outer surface 14 of the base body 3 and which has a circular cross-section in a cross-sectional plane (not shown) and is oriented transversely to the central axis 4. As will be explained in more detail below, the sleeve section 37 is provided at the end with a plurality of cams 38 each extending outwards in the radial direction.

In order to ensure the desired rotationally movable mounting of the clamping ring 17 on the base body 3, the clamping ring 17 comprises an annular part 42, which is formed rotationally symmetrically with respect to the central axis 4 and is formed with a U-shaped profiling as shown in FIG. 3. A shorter U-leg 43 of the ring part 42 engages in the groove 36. A longer leg 44 of the ring part 42 rests against an axially aligned end face 39 of the bearing section 35. Accordingly, the ring part 42 engages around the bearing section 35 in a manner that ensures a positive connection between the clamping ring 17 and the base body 3 with respect to linear movements and tilting movements transverse to the center axis. Furthermore, the desired rotational mobility of the clamping ring 17 relative to the base body 3 about the central axis 4 is ensured due to the design of the ring part 42 and the bearing section 35.

Furthermore, on an axial end face 45 facing away from the hexagonal profiling 5 of the base body 3, the clamping ring 17 is provided with three axial projections 46, each of which is formed in the shape of a section of a circular ring and is arranged coaxially with the central axis, the inner surfaces 47 of which projections are designed for mechanical interaction with the cam 38.

As can be seen from FIG. 2, the cams 38 have a wedge-shaped profiling in the representation plane according to FIG. 2, which is aligned parallel to the cross-sectional plane 15 according to FIG. 3. Viewing at the cam 38 in a circumferential direction 40 oriented clockwise according to the representation of FIG. 2, a distance 41 between the central axis 4 and an outer surface 55 of the cam 38 increases. In particular a substantially proportional distance increase is provided. Adjacent to the wedge-shaped profiling of the cam 38 is a concavely rounded profiling, wherein the distance of the outer surface 55, when viewed in the circumferential direction 40, initially decreases sharply in the region of the rounded profiling, and then changes again into a weaker curvature, which in turn then changes into the opposite, convexly curved outer surface of the sleeve section 37.

Figure 4:
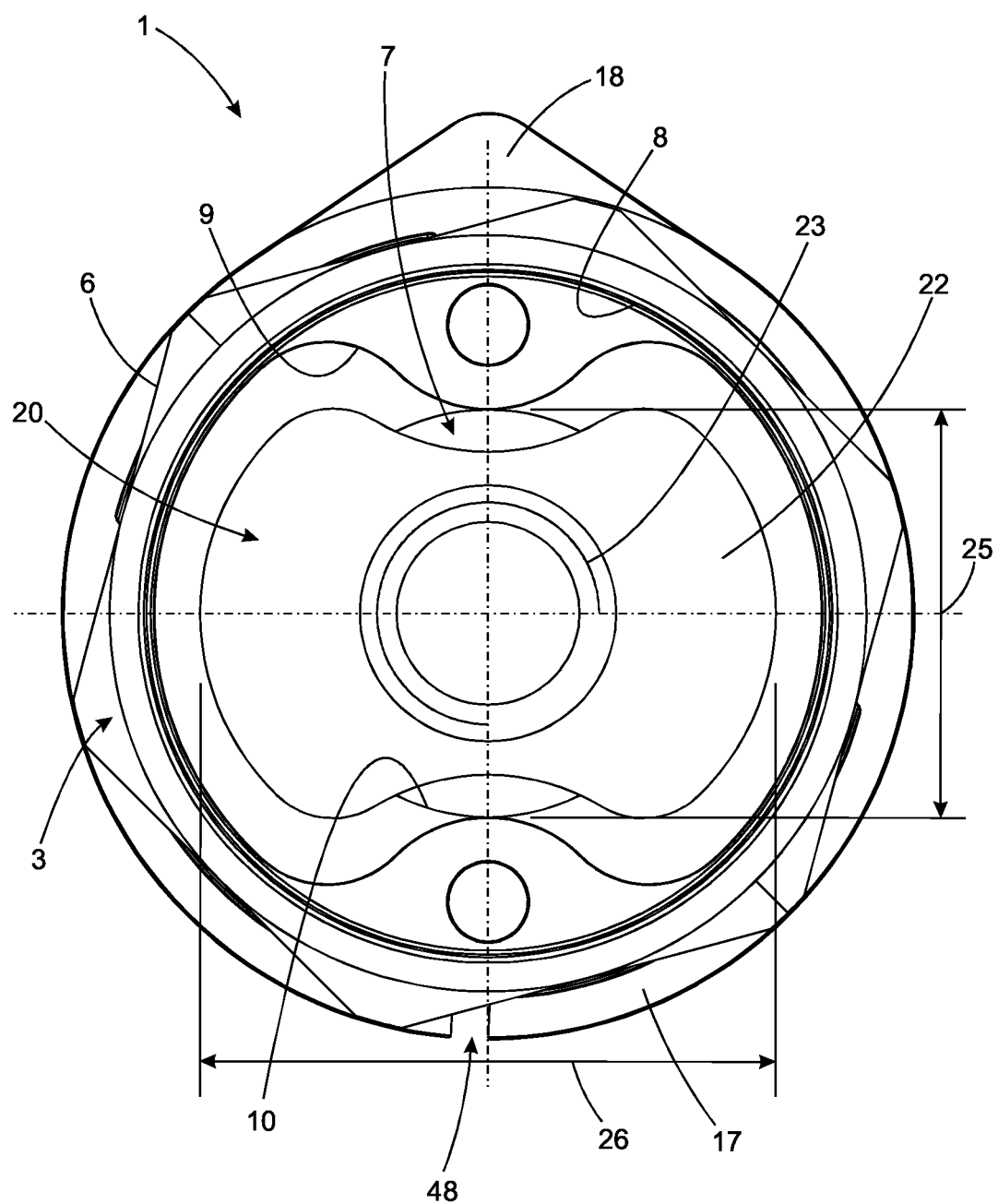
FIG. 4 a partially cut plan view of the fitting according to FIGS. 1 to 3, FIG. 5 a perspective view of a second embodiment of a fitting, FIG. 6 a sectional view of the second embodiment of the fitting according to FIG. 5, FIG. 7 a variant of the fitting according to FIGS. 5 and 6, FIG. 8 a partially sectioned top view of the fitting according to FIG. 7, FIG. 9 a perspective view of a third embodiment of a fitting, and FIG. 10 a sectional view of the fitting according to FIG. 9.

Furthermore, it is provided that the inner surfaces 47 of the axial projections 46 are convexly rounded at the ends at the transitions to the respective outer surfaces. This allows a displacement effect by the cam 38 with respect to the clamping ring 17 which displacement increases as uniformly as possible during a relative movement between the base body 3 and the clamping ring 17. Thus a force or torque increase for the relative movement is as uniform as possible when an increase in diameter of the clamping ring 17 is to be achieved by elastic or elastic and plastic deformation. In order to facilitate this increase in diameter for the clamping ring 17, the clamping ring 17 is provided with a relief slot 48 extending outwards in the radial direction, as can be seen in FIGS. 2 and 4.

A torque transmission between the fitting 1 and a recess in the wall section 2 takes place exclusively by friction. For this purpose, it is advantageous if an outer diameter of the axial projections 46 is selected to be only slightly smaller than an inner diameter of a recess formed in the wall section 2. For additional torque support, purely by way of example, a radially projecting extension or cantilever 18 is provided on the clamping ring 17, which cantilever 18 is provided in a radially outer end region with a support mandrel 19 extending along the central axis 4. This support mandrel 19 serves for an engagement in a second recess provided away from the recess formed for receiving the axial projection 46 and, via this, enables positive torque support between the clamping ring 17 and the wall section 2. For an increase in the frictional effect between the fitting 1 and the recess in the wall section 2, provision can be made to arrange a foil section, in particular a self-adhesive foil section, between the fitting 1 and the recess in the wall section 2. Such a foil section can also be used to effect a sealing effect between the fitting 1 and the recess in the wall section 2.

Figure 5:
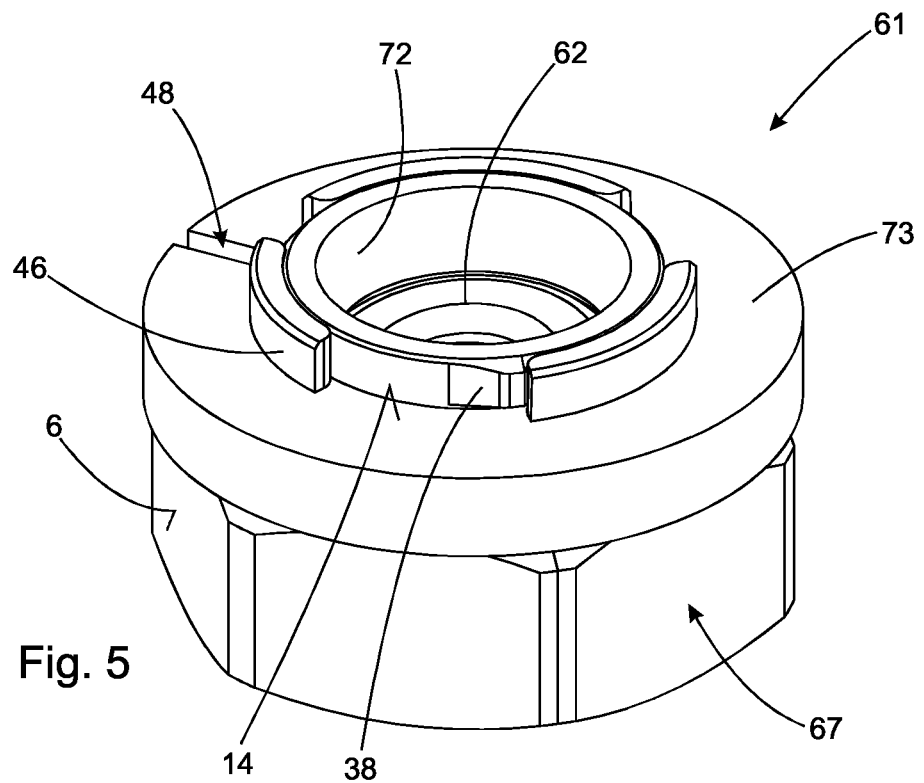
Figure 6:
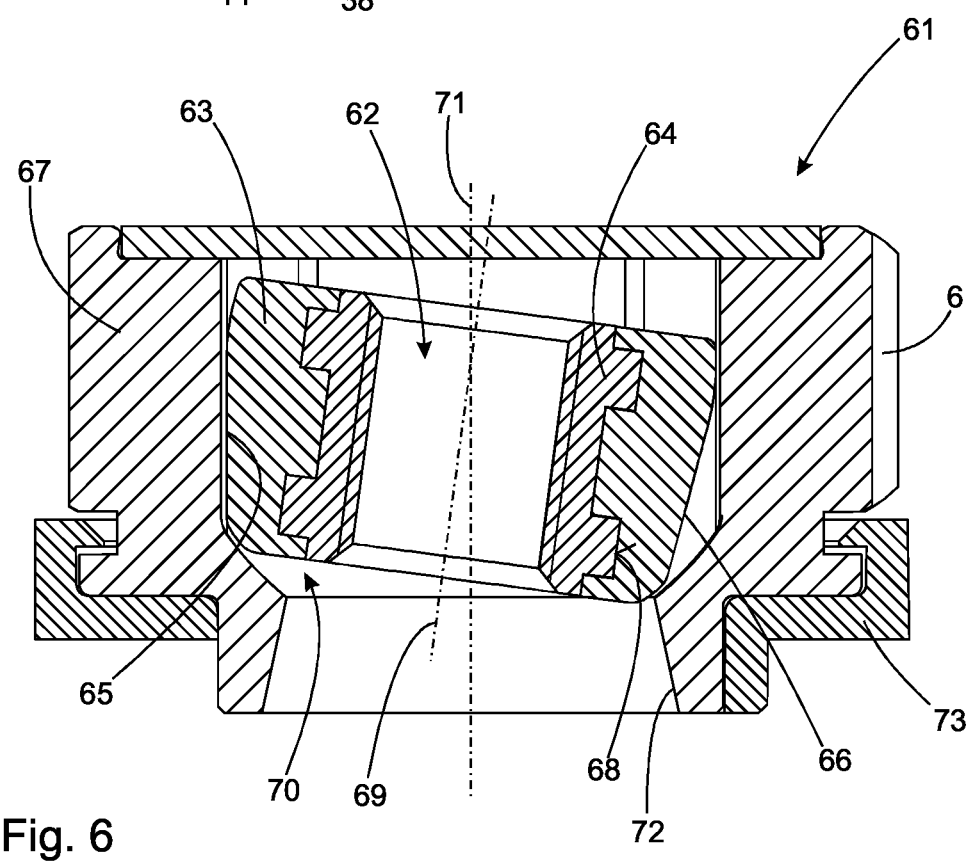

In the second embodiment of a fitting 61 shown in FIGS. 5 and 6, it is provided, in difference to the first embodiment according to FIGS. 1 to 4, that the coupling part 62 comprises a first coupling body 63 and a second coupling body 64 fixedly connected thereto. Exemplarily, it is provided that the first coupling body 63 is substantially formed as a pyramid section having a total of four side walls each aligned in a wedge shape with respect to each other. FIG. 6 shows the first side wall 65 and the second side wall 66, which are two of the total of four side walls of the first coupling body 63. By way of example, it is provided that the first coupling body 63 is made of a plastic material, for example a dimensionally stable plastic material such as PEEK (polyetheretherketone). With such a material an advantageous transmission of force and torque between the coupling part 62 and the base body 67 is ensured and self-lubricating properties are provided due to the material pairing with the base body 67, which is typically made of steel. The second coupling body 64 is received in the first coupling body 63. The second coupling body 64 may be overmolded by the first coupling body 63 in a plastic injection molding process. The second coupling body 64 is preferably made of metal, in particular steel, and is formed rotationally symmetrical to the thread axis 69 with respect to its outer surface 68.

The recess 70 in the base body 67 has a substantially square cross-section in a cross-sectional plane (not shown) and is aligned transversely to the central axis 71. In combination with the pyramid-shaped design of the first coupling body 63, a rotary coupling is thus created which enables torque transmission about the central axis 71 between the coupling part 62 and the base body 67. Furthermore, the pyramid-shaped design of the first coupling body 63 in conjunction with the square cross-section of the recess 70 enables tilting of the coupling part 62 about tilting axes which are not shown and which are aligned perpendicularly to the thread axis 69 and perpendicularly to one another and which intersect the side walls 65, 66 and the further side walls which are not visible with a minimum angle to the respective surface normal of the corresponding side wall.

In order to ensure a transmission of axial forces along the central axis 71 between the coupling part 62 and the base body 67, the recess 70 is designed partially convex to merge into a conical flared mouth opening 72. The mouth opening 72 delimits the mounting space for a screw (not shown), which can be tilted relative to the fitting 61 in a space of movement restricted by the geometries of the coupling part 62 and the recess 70, which is also in the form of a conical section.

The design of the fitting 61 with respect to the clamping ring 73 is identical to the design of the fitting 1, so that a more detailed description of the clamping ring 73 is unnecessary.

Figure 7:
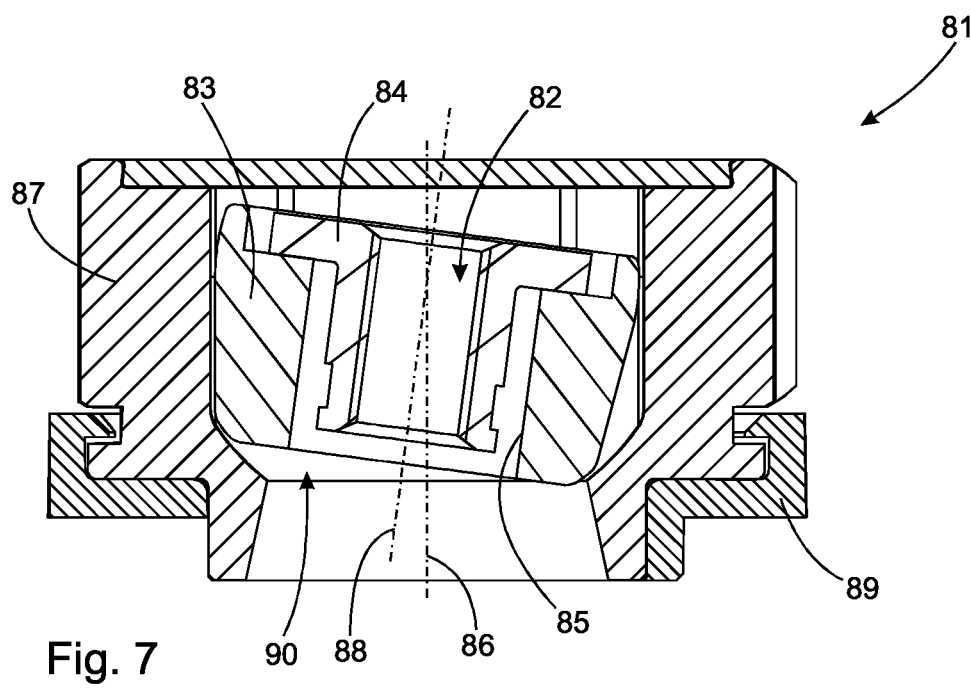
Figure 8:
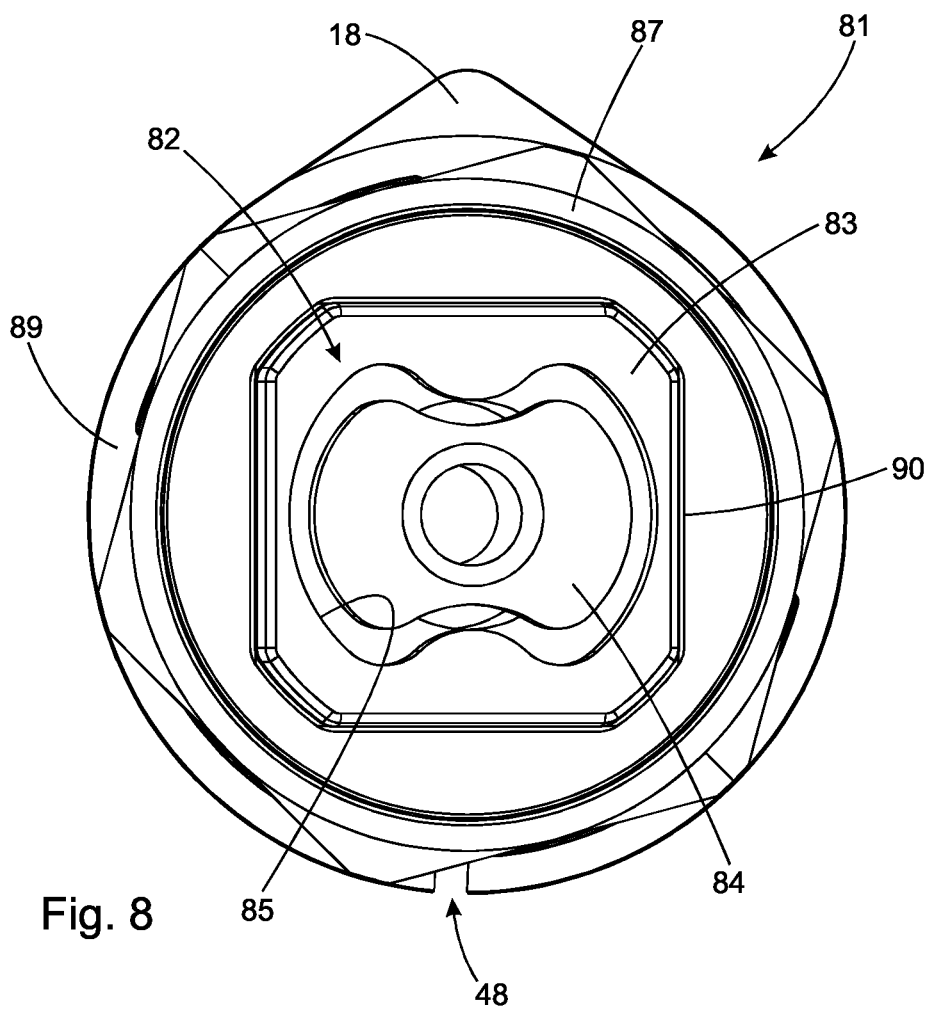

The third embodiment of a fitting 81 shown in FIGS. 7 and 8 is a variant of the second embodiment of the fitting 61 as shown in FIGS. 5 and 6, so that the same reference signs are assigned for functionally identical components and these components are not described again.

In contrast to the fitting 61, in the fitting 81 the coupling part 82 is formed from two separate coupling bodies 83, 84 which are movable relative to one another. The first coupling body 83 has the same external geometry as the first coupling body 63 and is intended to be received in a base body 87, which is of identical design to the base body 67. The substantially square profile of the recess 90 in the base body 87 can be seen in FIG. 8, which recess 90 is formed in the same manner as the recess 70 in the base body 67 of the second embodiment of the fitting 61.

The second coupling body 84 is formed in an identical manner to the coupling part 20 of the first embodiment of the fitting 1, so that the same reference signs are used for the second coupling body 84 as for the coupling part 20 and a new description is unnecessary.

The first coupling body 83 is provided with a recess 85 which is configured identically to the recess 7 of the base body 3, so that a new description is also unnecessary here and the same reference signs are used.

Accordingly, the third embodiment of the fitting 81 represents a hybrid version of the first embodiment of the fitting 1 and the second embodiment of the fitting 61. The fitting 81 allows both a tilting of the coupling part 82 in a limited angular range relative to the central axis 86 and a translational displacement of the second coupling body 84 relative to the first coupling body 83 in a plane of movement (not shown) which is oriented transversely to the thread axis 88 of the second coupling body 84.

Accordingly, the third embodiment of the fitting 81 enables both compensation of angular deviations and compensation of translational deviations between a recess in a wall section and a component to be attached thereto, such as a cladding.

The design of the fitting 81 with respect to the clamping ring 89 is identical to the design of the fitting 1, so that a more detailed description of the clamping ring 89 is unnecessary.

A method of operation for the fitting 81 can be described as follows:

First, the fitting 81 is inserted with the axial projections 46 into a recess (not shown in greater detail) in a wall section 2. It is assumed that the recess in the wall section 2 is circular in shape and has an inner diameter that is slightly larger than an outer diameter of the axial projections 46. Subsequently, a screw (not shown) which passes through a cladding (not shown) is screwed into the internally threaded bore 23 of the second coupling body 84. Here, due to the geometric design of the first coupling body 83 as well as the geometric design of the second coupling body 84, the coupling part 82 can align itself in an advantageous manner both with regard to an angular alignment with respect to the central axis 86 and with regard to a linear alignment between the thread axis 88 and the first coupling body 83. During the screwing-in process, torque is transmitted from the screw via the coupling part 82 to the base body 87, whereby, due to the geometric design of the first coupling body 83 and the second coupling body 84, a torque transmission with respect to the center axis 86 is ensured between the coupling part 82 and the base body 87 due to positive form fit. Due to this torque transmission, in particular taking into account the torque support by the friction between the axial projections 46 and the inner surface of the recess in the wall section 2 as well as of the support mandrel 19 in a second recess in the wall section 2, there is a relative movement between the base body 87 and the clamping ring 89. In the course of this relative movement, the cams 38 interact with the inner surfaces 47 of the axial projections 46 and therefore lead to an elastic or elastic and plastic expansion of the clamping ring 89 in the radial direction. This deformation increases the normal forces transmitted radially outward from the axial projections 46 to the inner surface of the recess in the wall section 2 and thus also the frictional forces resulting therefrom, so that both a rotationally fixed and a tension-resistant frictional coupling is created between the fitting 81 and the wall section 2.

Alternatively the fitting 81 may be coupled to the base body 87 by direct torque application, for example by means of an open-end wrench applied to the hexagonal profiling 5 of the base body 87. In such case, the screwing-in operation for the screw with which the component to be fastened is to be fixed to the coupling part 82 may be carried out at a later time.

In order to detach the fitting 81 from the wall section 2, it is intended to first remove the component fastened to the fitting 81 and the associated screw. It is possible that this already results in a rotational relative movement between the base body 87 and the clamping ring 89 in a direction in which the interaction between the cams 38 and the axial projections 46 is reduced. If this should not be the case, after removal of the component and the associated screw, a torque can be introduced on the hexagonal profiling 5 of the fitting 81 by means of a suitable tool, for example an open-end wrench, in order to introduce a loosening torque on the base body 87 about the central axis 86, resulting in the cam 38 being disengaged from the inner surfaces of the axial projections 46 and located in spaces 49 between the axial projections 46, thereby reducing elastic expansion of the clamping ring 89 to a minimum.

Figure 10:
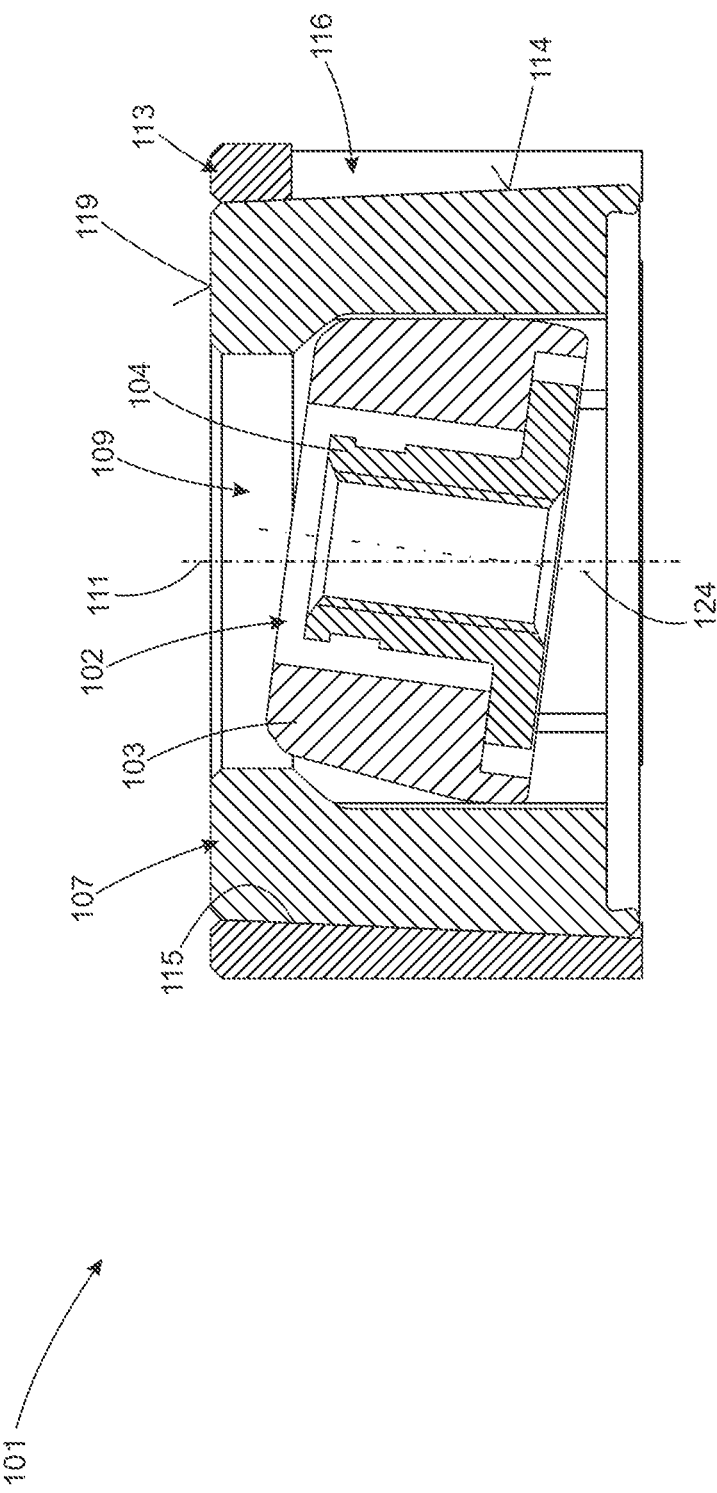

In the fourth embodiment of a fitting 101 shown in FIGS. 9 and 10, a further complete description of structures already known from the embodiments described above is dispensed with.

In the case of the fitting 101, it is provided that the base body 107 is provided with a recess 109 in the same manner as in the embodiments of fittings 1, 61 and 81 described above. A coupling part 102 is accommodated in this recess 109, which is shown in greater detail in FIG. 10 and which has a first coupling body 103 and a second coupling body 104, the first coupling body 103 being accommodated in the recess 109 such that it can pivot, and the second coupling body 104 being mounted such that it can move linearly with respect to the first coupling body 103. Accordingly, in the embodiment of the fitting 101 as shown in FIGS. 9 and 10, it can also be assumed that the second coupling body 104 is pivotally movable and linearly movable with respect to the base body 107, and thus that the spatial orientation of the thread axis 124 is variable.

As can further be seen from the illustration of FIGS. 9 and 10 the base body 107 is completely surrounded by a clamping ring 113, the clamping ring 113 being rotatably mounted on an outer surface 114 of the base body 107. The outer surface 114 of the base body and an inner surface 115 of the clamping ring 113 are each formed in the shape of conical sections, the geometries of the outer surface 114 and of the inner surface 115 being designed in such a way that the inner surface 115 bears flat against the outer surface 114.

The clamping ring 113 is provided with three control openings 116, each of which is slot-shaped and extends substantially in the direction of a central axis 111 of the recess 109. Two of the control openings 116 extend only over a region of the length of the clamping ring 113, while only the third control opening 116 extends over the entire length of the clamping ring 113, thereby contributing to a considerable improvement in the elastic deformability for the clamping ring 113. At each of the control openings 116, a respective edge 117 of a purely exemplary rounded configuration is provided for interaction with a cam 118 formed on the outer surface 114 of the base body 107. As can be seen from the detailed view of FIG. 9, a control edge 121 of the cam 118, which results from the radius difference between a radius of the outer surface 114 of the base body 107 and a radius of the cam 118, is oriented at an acute angle to the edge 117. This acute-angled alignment of the control edge 121 with respect to the central axis 111, which also serves as the axis of rotation for the relative movement of the clamping ring 113 with respect to the base body 107, results in a gradual overlap between the cam 118 and the inner surface 115 of the clamping ring 113 in the course of this rotational movement. This can ensure a slowly increasing torque curve for a torque required for the relative movement between the clamping ring 113 and the base body 108.

On an axially aligned end face 119 of the base body, three bores 120 are arranged at the same angular pitch to the central axis 111, which bores 120 can be used for engagement of a tool (not shown), which tool is equipped with pins corresponding to the bores 120. Such a tool can be used to provide torque support for the base body. Further, it may be provided that another tool, also not shown, may be used to engage the through slot of the control aperture 116 to thereby provide torque support for the clamping ring 113. By way of example the stop member 101 may be inserted into a blind hole in a workpiece (not shown), and then to be locked in the workpiece by relative rotational movement between the base member 107 and the clamping ring 113 by use of tools (not shown) which engage the holes 120 in the base member 107 and the slot in the clamping ring 113. In a subsequent step, a body (not shown) can then be fixed to the workpiece equipped with the fitting 101 using a screw screwed into the coupling part 102.

What is claimed is:

1. A fitting for fixing a threaded element to a wall section, comprising a base body which is penetrated by a recess, which recess is extended along a central axis, further comprising a clamping ring which is mounted on an outer surface of the base body and which is rotatably movable with respect to the outer surface, wherein a cam is assigned to the outer surface of the base body or to the clamping ring, which cam effectuates a change in diameter of the clamping ring during a rotary movement of the clamping ring relative to the base body, wherein a coupling part is movably received in the recess and forms with the base body a rotary coupling for a transmission of a torque between the coupling part and the base body about the central axis, wherein a threaded portion of the coupling part determines a thread axis, wherein the coupling part is accommodated in the recess with a variable orientation of the thread axis within a predetermined angular interval and/or within a predetermined distance interval to the central axis, and wherein an outer surface of the coupling part defines a first circumferential profile in a plane perpendicular to the central axis and wherein an inner surface of the recess defines a second circumferential profile in the plane perpendicular to the central axis, the first circumferential profile forming with the second circumferential profile the rotary coupling for the transmission of the torque between the coupling part and the base body in a functional position, wherein a relative movement between the coupling part and the base body with at least one geometrically limited rotational degree of freedom and/or at least one geometrically limited linear degree of freedom of movement is enabled in between a release position and the functional position for the coupling part and the base body, and wherein the first circumferential profile comprises round recesses and the second circumferential profile comprises round projections, the round projections of the second circumferential profile being disposed within the round recesses of the first circumferential profile, whereby the first circumferential profile substantially matches is geometrically similar to the second circumferential profile.

2. The fitting according to claim 1, wherein the coupling part has a first cross-section in a cross-sectional plane aligned transversely to the central axis, and wherein the recess has a second cross-section in the cross-sectional plane, the first cross-section and the second cross-section being geometrically identical.

3. The fitting according to claim 1, wherein the clamping ring comprises a cantilever projecting transversely to the central axis in a radial direction, which cantilever is provided at an end with a supporting mandrel extending along the central axis.

4. The fitting according to claim 1, wherein the cam is formed with a wedge-shaped profiling on an arcuate outer surface of the base body, which projects outwards in a radial direction, and wherein the clamping ring is provided with at least one recess which, in a release position of the clamping ring relative to the base body, is configured to receive the cam.

5. The fitting according to claim 1, wherein the coupling part has a guide section which is arranged between a first axial surface of the base body and a second axial surface of the base body, which second axial surface is formed opposite to the first axial surface, in order to ensure a limitation of relative movements of the coupling part with respect to the base body to linear movements in a movement plane aligned transversely to the central axis.

6. The fitting according to claim 1, wherein the coupling part comprises a first coupling body which is tiltably movable about at least one axis oriented transverse to the central axis of the base body, and further comprises a second coupling body which is provided with the threaded portion and which is mounted on the first coupling body such that it can move linearly with respect to the first coupling body.

7. The fitting according to claim 1, wherein a region of the recess has a smaller cross-section than the coupling part to provide an undercut for the coupling part which undercut enables a positive transmission of force between the coupling part and the base body along the central axis.

8. The fitting according to claim 1, wherein the clamping ring surrounds the outer surface of the base body and wherein the outer surface of the base body and an inner surface of the clamping ring are each formed in a shape of cone sections.

9. The fitting according to claim 8, wherein a control edge determined by the cam is oriented at an acute angle to an edge of a recess in the clamping ring.

10. The fitting according to claim 1, wherein the first circumferential profile can be transferred into the second circumferential profile by stretching the first circumferential profile in two spatial directions perpendicular to each other in the plane perpendicular to the central axis.

11. The fitting according to claim 1, wherein the round recesses of the first circumferential profile comprise two diametrically opposed round recesses and the round projections of the second circumferential profile comprise two diametrically opposed round projections.

* * * * *